(12) United States Patent
Frazier (10) Patent No.: US 9,374,475 B1
(45) Date of Patent: Jun. 21, 2016

(54) SYSTEM FOR PROCESSING CUSTOMER RECORDS

(71) Applicant: Bradley Apps, Seattle, WA (US)

(72) Inventor: Tom Frazier, Bellevue, WA (US)

(73) Assignee: OCTOPUS VENTURES INC., Seattle, WA (US)

( * ) Notice: Subject to any disclaimer, the term of this patent is extended or adjusted under 35 U.S.C. 154(b) by 0 days.

(21) Appl. No.: 14/826,141

(22) Filed: Aug. 13, 2015

Related U.S. Application Data (63) Continuation of application No. 14/617,766, filed on Feb. 9, 2015.

(51) Int. Cl.
*H04M 15/00* (2006.01)

(52) U.S. Cl.
CPC ............ *H04M 15/41* (2013.01); *H04M 15/765* (2013.01)

(58) Field of Classification Search
CPC ..... H04M 15/00; H04M 15/12; H04M 15/44; H04M 15/8083; H04M 2215/0104; A45D 40/0087; A45D 40/265; H04L 41/22; G06F 11/327; G06F 11/3495; G06F 17/30893; G06Q 20/102; G06Q 30/04
USPC .................. 379/111, 112.01, 112.06, 114.01, 379/114.03, 115.01, 121.01, 121.03, 379/121.05, 126, 127.01; 455/405–408
See application file for complete search history.

(56) References Cited

U.S. PATENT DOCUMENTS

| 5,325,290 | A | * | 6/1994 | Cauffman | ........ | G06Q 308/0284 |
| | | | | | | 379/114.01 |
| 5,987,107 | A | * | 11/1999 | Brown | .................. | H04M 15/00 |
| | | | | | | 379/111 |
| 6,658,099 | B2 | | 12/2003 | Perkins, III | | |
| 6,891,938 | B1 | * | 5/2005 | Scott | ..................... | H04M 15/00 |
| | | | | | | 379/112.01 |
| 7,225,249 | B1 | * | 5/2007 | Barry | ................. | G06F 17/3089 |
| | | | | | | 709/227 |
| 8,634,805 | B2 | | 1/2014 | Raleigh | | |
| 8,929,858 | B1 | * | 1/2015 | Pryor | .................... | H04M 15/00 |
| | | | | | | 455/406 |
| 2004/0117345 | A1 | * | 6/2004 | Bamford | ............ | G06F 17/3038 |
| 2006/0129499 | A1 | * | 6/2006 | Combar | ............ | G06F 17/30893 |
| | | | | | | 705/64 |
| 2011/0161379 | A1 | | 6/2011 | Grund et al. | | |
| 2014/0372486 | A1 | | 12/2014 | Bose et al. | | |

OTHER PUBLICATIONS

Australian Application 2015203450—Full Examination Report Aug. 12, 2015.

* cited by examiner

*Primary Examiner* — Quoc D Tran
(74) *Attorney, Agent, or Firm* — FSP LLC (57) ABSTRACT

A transactional processing system includes a central storage system utilized to form a scalable pipeline for processing activity records into invoices subscriber usage records and invoices. Activity records received by the transactional processing system are queued and processed into "shards" and shards are stored in the central storage system. and queued for processing into billing records. Sharded activity records applicable for billing are stored by the central storage system and queued for processing into "shards", and shards are stored by the central storage system for processing into invoices.

20 Claims, 6 Drawing Sheets

SYSTEM FOR PROCESSING CUSTOMER RECORDS

BACKGROUND

Billing systems may suffer from situations in which invoices are sent out before processing of all items that should go on that invoice has completed. In general, this is a scalability issue. Billing systems that normally process all invoice items on time may become overwhelmed under busy conditions (e.g., high customer activity, or many new customers joining or customers changing their billing plans). The billing cycle (time period for adding new invoice items to invoices) may remain unchanged even though there are many more items to process, or timing issues (e.g., race conditions) may cause items to be processed under the wrong plans.

In addition to billing related limitations, the real-time presentation of detailed usage information during a particular transaction period traditionally also suffers from bottlenecks related to database and system performance.

An example situation in which this problem may occur is in telecommunication billing systems. It may be necessary to process all call detail records (potential invoice items for customer activity) within a fixed time period and with real time response to customer service level and/or plan changes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"CDR" in this context refers to call detail record, also known as call data record, is a data record produced by a telephone exchange or other telecommunications equipment that contains attributes that are specific to a single instance of a phone call or other communication transaction that was handled by that facility or device.

"Database" in this context refers to an organized collection of data (states of matter representing values, symbols, or control signals to device logic), structured typically into tables that comprise 'rows' and 'columns', although this structure is not implemented in every case. One column of a table is often designated a "key" for purposes of creating indexes to rapidly search the database.

"XML" in this context refers to eXtensible Markup Language, a standard that forms the basis for many modern markup languages. XML is a flexible basis for languages that define a format for structured data designed to be interpreted by software on devices. XML by itself is not a data format. Examples of XML-based standards include xHTML, for creating web pages, RSS, for feeds of new information (such as news headlines), and SyncML, for managing personal data such as contacts, email, files, and events.

DESCRIPTION

A system is described in which the processing, timing, and arrangement of storage result in a number of advantageous features. The system decentralizes aspects of transaction processing that are traditionally centralized. To this end, multiple queues and databases may be utilized at different stages of a processing pipeline. An end result is that transaction records are processed in a timely and scalable manner, both for billing and for presentation of activity records to customers via a machine network interface (e.g., via a web page interface).

One embodiment of the system performs processing of call detail record (CDR, e.g., "carrier artifacts") into invoice items. The system may process these artifacts into customer invoices in a parallel and scalable fashion. CDRs may be input as XML from different telecommunication carriers and normalized to a common internal format. The CDRs may be classified according to call type. Type-classified CDRs are stored in "shard file" containers, for example in a cloud storage system. Call type assignment helps identify which calls are applicable for billing purposes. An example is a call type 'free' included in a mobile phone plan (free national talk and text). Another example is a call type 'international' which would undergo additional processing to determine any applicable tariff, the fee charged to the customer, etc.

In one embodiment, CDR XML is parsed into database records, and the XML attributes are transformed to database fields. Profiling logic is executed on the database records to assign a call type to the records. CDR records are then physically organized into "shards", which are group associations around a call placement time. All CDRs in a particular shard comprise a call placement time within a fixed time interval unique to that shard. Within each shard, the records are sorted by call time. An example shard time interval is fifteen minutes. Duplicate detection is executed against each shard, either periodically, in batch (e.g., when the shard is created), or triggered by a new incoming record. An example of a shard organization, in familiar file-system notation, is:

line/year/month/day/15 minute interval/activity records, sorted by placement time.

In this example, the "line" is a consumer line identifier, which acts as a unique identifier of a subscriber (billing) account. The year/month/day correspond to a date when line activity occurred. For example, these could be the date components for a call placement time. A "bucket" is created corresponding to a time interval within a day, for example a fifteen minute activity time interval. Records having an activity time within this interval are then stored in the bucket. Within the bucket, they are sorted by the actual activity time.

The system assigns a global identity (unique identity among all billing data records being processed at a given time) to each billing data record. As records are assigned into their respective shards, global identity assignment may take place as for example by checking if a neighbor record has an identical call placement time (records are sorted within the shard by call placement time). If it does, the set global identity as follows: global identify=(call_placed_time LS 20)+1. Otherwise, set the global identify as follows: global identity=(call_placed_time LS 20). (LS=left shift operation).

In one embodiment, the overall process of processing transactions is divided into tasks. The system further comprises multiple distributed databases, used to share data between distributed tasks and different processing phases. Task inputs are read from a respective database and task outputs are stored to a respective database, in an order defined by an inter-task queue for each phase. The system assigns a global identity (unique identity among all billing data records being processed at a given time) to each billing data record. As records are assigned into their respective shards, global identity assignment may take place as for example by checking if a neighbor record has an identical call placement time (records are sorted within the shard by call placement time). If it does, the set global identity as follows: global identify= (call_placed_time LS 20)+1. Otherwise, set the global identify as follows: global identity=(call_placed_time LS 20). (LS=left shift operation). In one embodiment, the overall process of processing transactions is divided into tasks. The system further comprises multiple distributed databases, used to share data between distributed tasks and different processing phases. Task inputs are read from a respective database and task outputs are stored to a respective database, in an order defined by an inter-task queue for each phase. In one embodiment for telecommunication CDR processing, the system may utilize devices and logic that integrate with the service delivery platform of multiple carriers. This integration system may comprise a collection of services and databases that are used for storing and processing customer information and related artifacts. For example, the CDRs with a billable requirement may be stored by this integration system, as is the corresponding customer payment processing. An example of this integration system is referred to herein as the Carrier Customer Relationship Management System (CCRMS). A detail processing pipeline embodiment for generating invoices is now described. Processing begins with receipt of a telecommunication carrier's retail activity artifacts (e.g., CDRs), and ultimately concludes with creation of files that can be loaded directly into an CCRMS database for further processing into invoices/billing statements. A detail processing pipeline embodiment for generating invoices is now described. Processing begins with receipt of a telecommunication carrier's retail activity artifacts (e.g., CDRs), and ultimately concludes with creation of files that can be loaded directly into an CCRMS database for further processing into invoices/billing statements. A detail processing pipeline embodiment for generating invoices is now described. Processing begins with receipt of a telecommunication carrier's retail activity artifacts (e.g., CDRs), and ultimately concludes with creation of files that can be loaded directly into an CCRMS database for further processing into invoices/billing statements. A detail processing pipeline embodiment for generating invoices is now described. Processing begins with receipt of a telecommunication carrier's retail activity artifacts (e.g., CDRs), and ultimately concludes with creation of files that can be loaded directly into an CCRMS database for further processing into invoices/billing statements. In one embodiment, transaction activity records are stored (sharded) using a convention that enables simple determination of the activity call time period/time by inspecting its filepath/filename. A first phase of the pipeline is responsible for parsing and classifying carrier artifacts. Relevant data are extracted and serialized to a format such as JSON or MessagePack. Usage records are parsed and assigned their respective client and phone identifiers. This involves some metadata available to map, for example, IMEIs to phone/client for a given date-time. An separate database of information may be used for the client/phone identity mapping. While it could be the IMEI, some embodiments utilize an abstracted layer called a 'line' so that a client can change either a) their number or b) their handset without impacting the unique identifier (the line number). This is useful because the CDR files given from the carrier(s) can include the phone number, IMEI or both. A second phase of the pipeline filters the outputs of the earlier CDR processing. This phase filters out billable activity records, which reduces the data set for processing by downstream invoice-related tasks. Non-billable CDRs are records included in the selected plan for the client's line that don't generate costs to the client. An example is any national talk and/or text CDRs included in an Unlimited Talk & Text' plan. Non-billable records may still be retained for downstream processing into a client activity interface (e.g., a customer web interface). A second phase of the pipeline filters the outputs of the earlier CDR processing. This phase filters out billable activity records, which reduces the data set for processing by downstream invoice-related tasks. Non-billable CDRs are records included in the selected plan for the client's line that don't generate costs to the client. An example is any national talk and/or text CDRs included in an Unlimited Talk & Text' plan. Non-billable records may still be retained for downstream processing into a client activity interface (e.g., a customer web interface). A second phase of the pipeline filters the outputs of the earlier CDR processing. This phase filters out billable activity records, which reduces the data set for processing by downstream invoice-related tasks. Non-billable CDRs are records included in the selected plan for the client's line that don't generate costs to the client. An example is any national talk and/or text CDRs included in an Unlimited Talk & Text' plan. Non-billable records may still be retained for downstream processing into a client activity interface (e.g., a customer web interface). A third phase transforms billable activity records into invoice line items. The billable activity records generated from the previous phase are each assigned a charge. Time-dependent meta-data is applied to determine the charge for an activity record. An example of this metadata is the per-minute talk rate associated with calling a specific country. A CDR that indicates a voice call with a US origin & terminated in a foreign country would typically incur a charge rate per minute. Up to this point in the "pipeline", there's been a one-to-one correspondence between the output of one phase and the input of the following phase in the pipeline. This enables an even distribution of tasks among resources of the processing cluster. However, a fourth phase partitions invoice lines by their client identifier and groups together (e.g., into a file or "bucket") the activity records for a defined time-period (from multiple clients). These collections are then split into N smaller buckets, where N represents a power-of-2 such as 64, 128, 256 . . . . . A technique referred to herein as hash-range partitioning is employed. The client identifier of each invoice line (previously mapped to the invoice line using, for example, an MSISDN) is hashed using the leading M-bits of this result as the bucket it is assigned to (where M=log 2 N). A fifth phase collects the client-partitioned records of the previous phase into a single bulk package suitable for loading back into the CCRMS for processing into invoices. This phase collates the many small buckets from the previous phase into fewer larger outputs (e.g., files). This phase operates differently than the others because it is operating on multiple inputs. Tasks for this phase are not scheduled on a per-output of the prior phase basis. The task scheduler delays further processing until all outputs assigned to a particular bulk package have been generated. A fifth phase collects the client-partitioned records of the previous phase into a single bulk package suitable for loading back into the CCRMS for processing into invoices. This phase collates the many small buckets from the previous phase into fewer larger outputs (e.g., files). This phase operates differently than the others because it is operating on multiple inputs. Tasks for this phase are not scheduled on a per-output of the prior phase basis. The task scheduler delays further processing until all outputs assigned to a particular bulk package have been generated.

DRAWINGS

Figure 1:
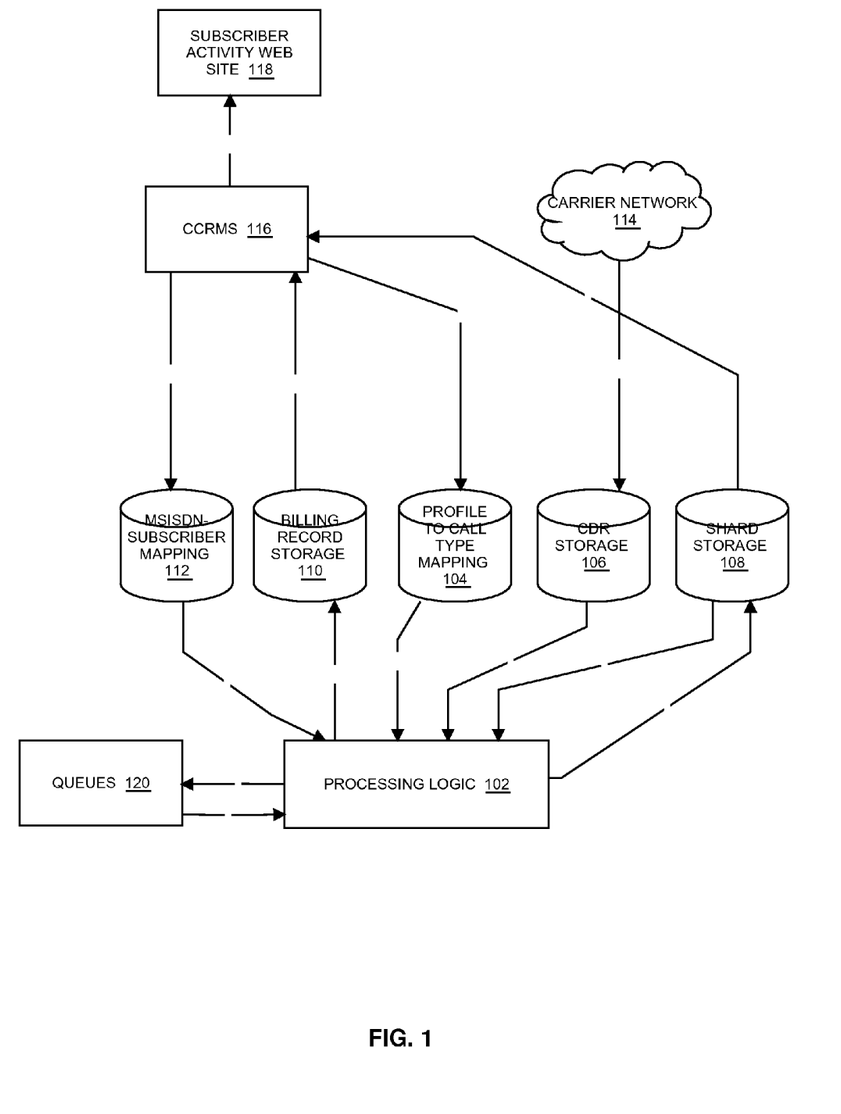
FIG. 1 illustrates an embodiment of a transaction processing system.

FIG. 1 illustrates an embodiment of a transaction processing system. Transaction processing logic 102 interacts with a multitude of databases 104-112 and queues 120 to form a processing pipeline of transaction artifacts into invoices and subscriber activity records. A network external to the system, e.g. a carrier network 114, provides activity artifacts to, for example, a CDR storage database 106. A CCRMS 116 provides mapping information for typing artifacts and matching them to subscribers. For example, in a telecommunication carrier processing system, these mappings may include MSISDN to subscriber mappings provided to a database 112, and profile to call type mappings provided to a different database 104. As the processing logic 102 shards the artifacts, prior processed artifacts are merged into the processing pipeline from shard storage 108 and newly processed shards are stored back into shard storage database 108. Subscriber activity records processed out of the pipeline in shards are (optionally) bundled and provided to the CCRMS 116 from shard storage database 108. For invoice production, shards that represent billable actions are output via a billing record storage database 110 to the CCRMS 116, and from there provided to subscriber activity web site 118.

An example pipeline for processing carrier network CDRs will now be described. This example utilizes multiple databases, in parallel, and multiple queues, in parallel, along with an unusual shard recycling mechanism. In the example system, a CDR artifact is stored into the CDR database 106 by the carrier network 114. This causes a notification (an activation signal) to be made to a distinct CDR processing queue, which schedules the CDR for processing by the processing logic 102. Eventually the queued CDR artifact is retrieved from the CDR database 106 for processing by the processing logic 102, along with profile-to-calltype and MSISDN-to-subscriber mappings retrieved from respective distinct databases 104 and 112, respectively. At this point in the pipeline, shard recycling occurs. Shards for a particular timeslot are retrieved from the shard database 108 and merged with shards produced from the CDRs under processing. The merged stream is then stored back to the shard database 108 again.

At this stage, billing records are generated and stored to the billing record database 110, and next generation of profile-to-calltype and MSISDN-to-subscriber mappings imported are imported into the respective databases 104, 112 from the CCRMS 116. The CCRMS 116 may then import shards representing subscriber activity from the shard database 108 and provide these to the subscriber activity web site 118.

Figure 2:
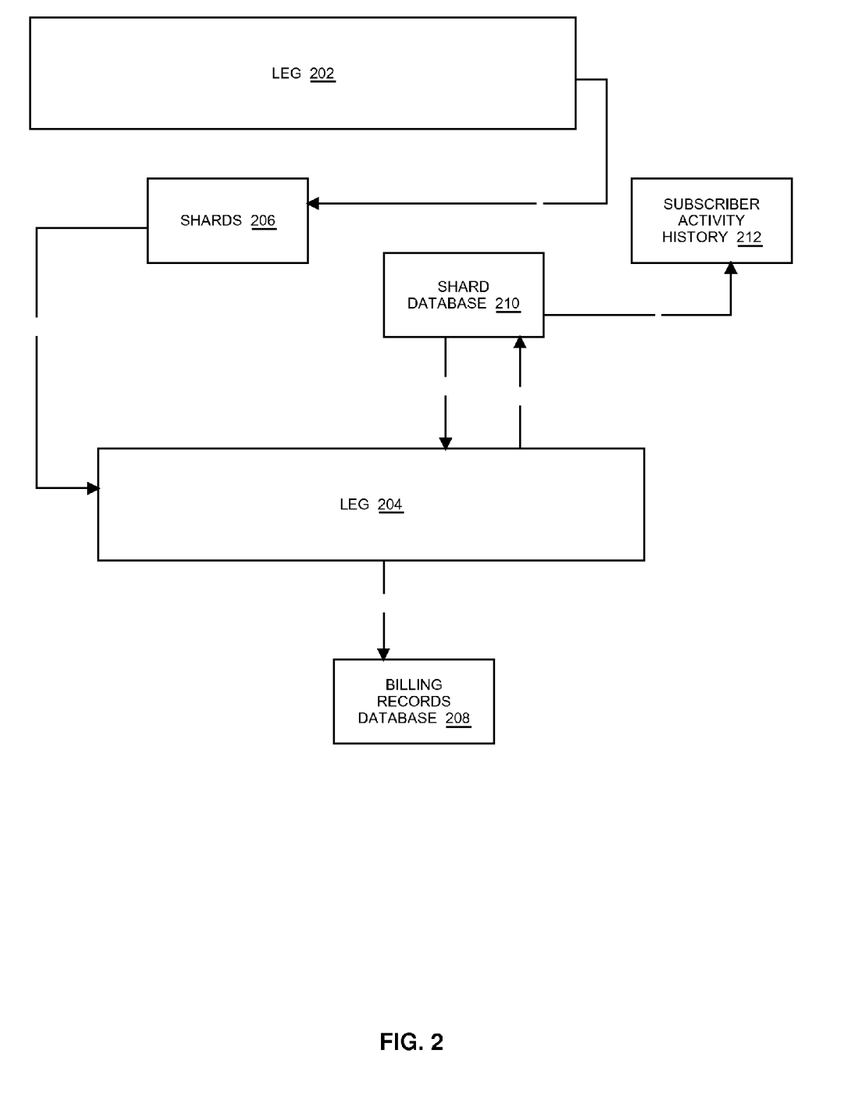
FIG. 2 illustrates an example of a parallel pipeline transaction processor for telecommunication carrier artifacts.

FIG. 2 illustrates an example of a parallel pipeline transaction processor for telecommunication carrier artifacts. More generally this pipeline architecture may be utilized to process transaction records into invoices and into updates to a web-based subscriber billing interface. The system comprises a first pipeline leg 202 that produces a stream of shards 206, and a second processing leg 204 that generates final shard sets and stores these shards in a shard database 210, and processes the shards into billing records in a billing record database 208 and activity records in a subscriber activity history database 212.

One leg of the pipeline (202) is responsible for sharding new transaction records imported into the system. A second leg (204) is responsible for merging new shards and existing shards, filtering the merged set, and publishing billing and activity records formed from sets of related shards.

The first leg of the pipeline 202: 1. transforms CDR XML to calldata record streams, 2. assigns a subscriber id and a phone id (device id) to each record, 3. populates billdata fields (e.g. calltype id), 4. Shards by call placed time, and saves the shards to storage.

In parallel with the processing by the first leg1 202, the second pipeline leg 204: 1. reads shards from the first stage 202, and sorts within the shards in ascending order by call placed time, 2. merges stored shards with the shard stream produced by the first stage 202, 3. filters duplicate shards out of the stream, 4. assigns each shard a global unique identifier, 5. stores the merged and filtered shards, 6. filters out billable and non billable shards for (optional) bundling for production of invoices and subscriber activity records.

At stage 2 (merger) of the second leg 204 of the pipeline, the current shard set being processed is merged with existing (stored) shards. This "recycling" reprocesses a record set multiple times, filtering for errors/duplicates each time. The merged set is de-duplicated stored again (stages 3 and 5 of leg 204). A majority (usually a great majority) of the time there will be no existing (stored) shards to merge at stage 2; therefore most of time time shards finally get output at stage 6. Stage 4 is where the mapping is applied to the de-duplicated shards.

Figure 3:
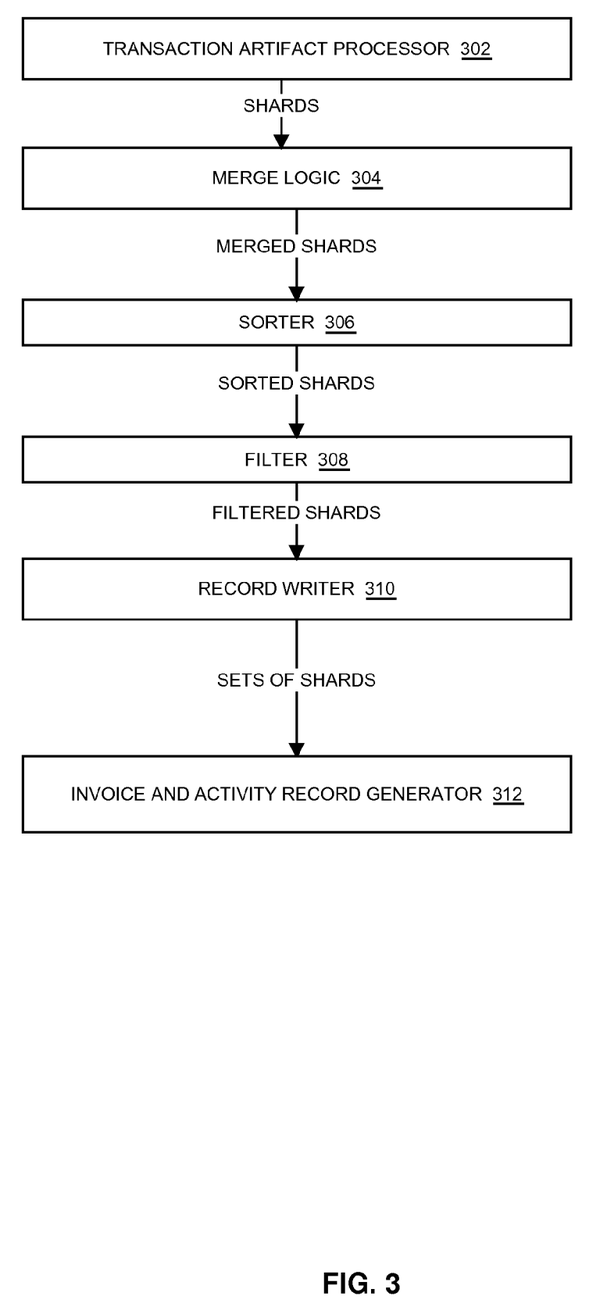
FIG. 3 is a system diagram of an embodiment of a transaction processor.
Figure 4:
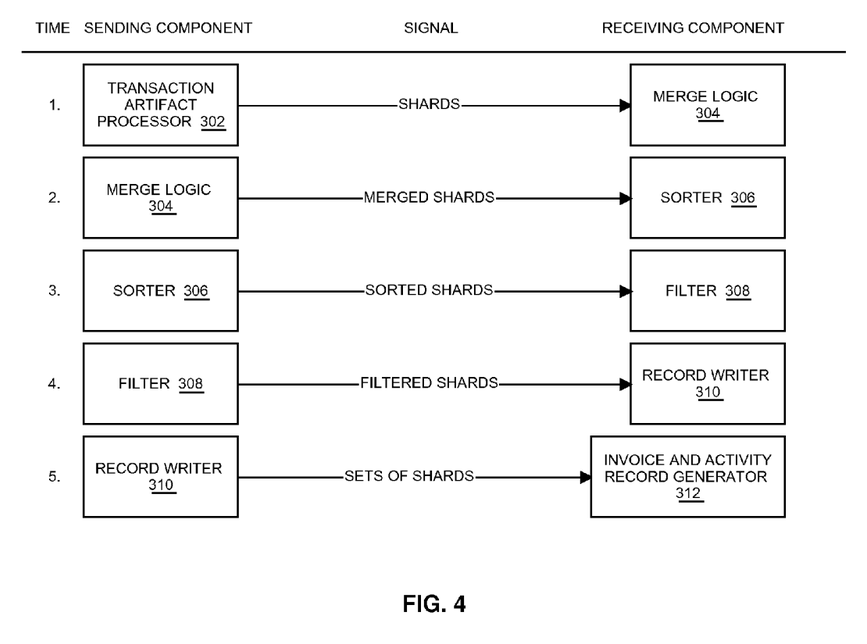
FIG. 4 is an action flow diagram of an embodiment of a transaction processing process.
Figure 5:
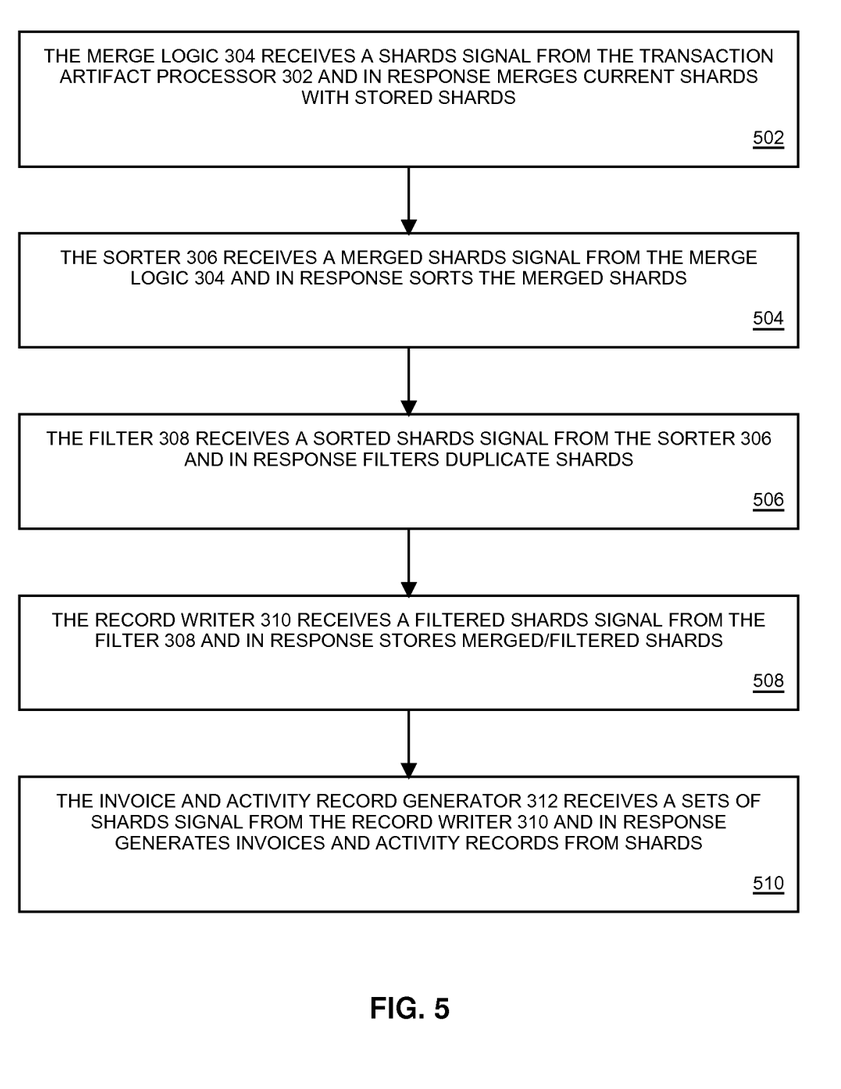
FIG. 5 is a flow chart of an embodiment of a transaction processing process.

FIG. 3 is a system diagram of an embodiment of a transaction processor. FIG. 4 is an action flow diagram of an embodiment of a transaction processing process. FIG. 5 is a flow chart of an embodiment of a transaction processing process. The system comprises transaction artifact processor 302, merge logic 304, sorter 306, filter 308, record writer 310, and invoice and activity record generator 312. The merge logic 304 receives a shards signal from the transaction artifact processor 302 and in response merges current shards with stored shards (502). The sorter 306 receives a merged shards signal from the merge logic 304 and in response sorts the merged shards (504). The filter 308 receives a sorted shards signal from the sorter 306 and in response filters duplicate shards (506). The record writer 310 receives a filtered shards signal from the filter 308 and in response stores merged/filtered shards (508). The invoice and activity record generator 312 receives a sets of shards signal from the record writer 310 and in response generates invoices and activity records from shards (510).

Figure 6:
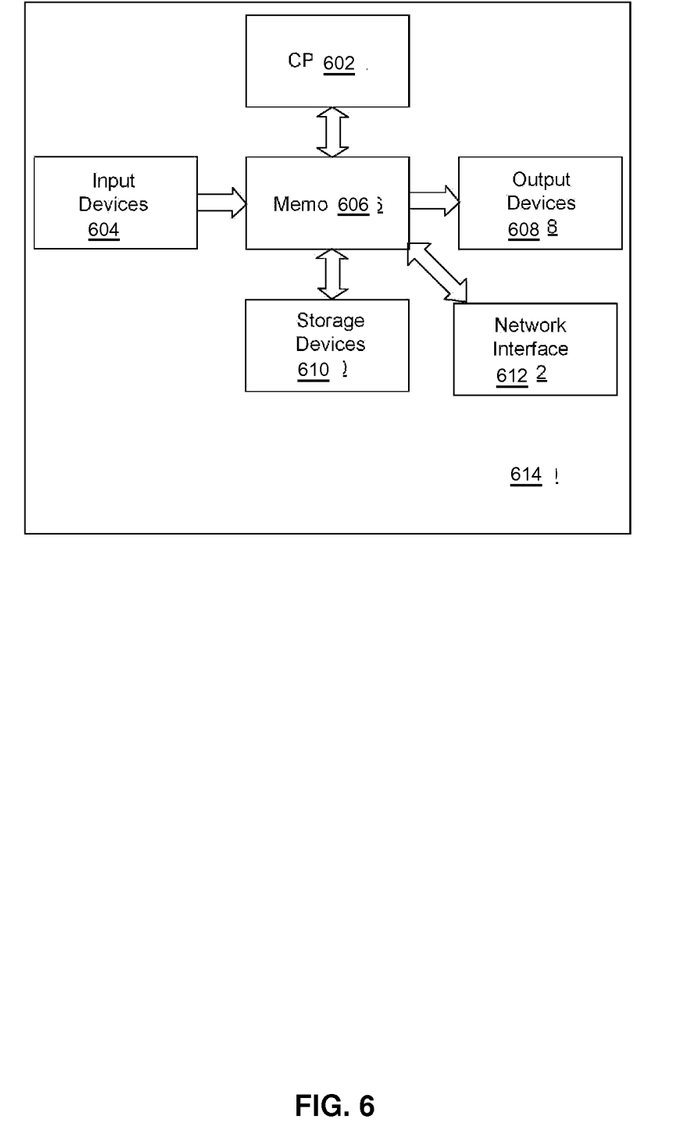
FIG. 6 illustrates a machine which can implement various components described herein.

FIG. 6 illustrates a machine which can implement various components described herein (e.g., any one or more of the components of FIG. 1 or 2). Input devices 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 604 are provided via various machine signal conductors (e.g., busses or network interfaces) and circuits to memory devices 606. The memory devices 606 is typically what is known as a first or second level memory device, providing for storage (via configuration of matter or states of matter) of signals received from the input devices 604, instructions and information for controlling operation of the CPU 602, and signals from storage devices 730. Information stored in the memory devices 606 is typically directly accessible to processing logic 602 of the device. Signals input to the device cause the reconfiguration of the internal material/energy state of the memory device 606, creating in essence a new machine configuration, influencing the behavior of the device 614 by affecting the behavior of the CPU 602 with control signals (instructions) and data provided in conjunction with the control signals. Second or third level storage devices 610 may provide a slower but higher capacity machine memory capability. Examples of storage devices 610 are hard disks, optical disks, large capacity flash memories or other non-volatile memory technologies, and magnetic memories. The processing logic 602 may cause the configuration of the memory 606 to be altered by signals in storage devices 610. In other words, the CPU 602 may cause data and instructions to be read from storage devices 610 in the memory 606 from which may then influence the operations of CPU 602 as instructions and data signals, and from which it may also be provided to the output devices 608. The CPU 602 may alter the content of the memory of 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile. Output devices 608 are transducers which convert signals received from the memory 606 into physical phenomenon such as vibrations in the air, or patterns of light on a machine display, or vibrations (i.e., haptic devices) or patterns of ink or other materials (i.e., printers and 3-D printers). Communication interface 612 receives signals from the memory 606 and converts them into electrical, optical, or wireless signals to other machines, typically via a machine network. Communication interface 612 also receives signals from the machine network and converts them into electrical, optical, or wireless signals to the memory 606.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

What is claimed is:

1. A scalable transaction processing system, comprising:
a central machine data storage system;
a digital data queuing system;
an activity record processing system;
activity records stored in the central machine data storage system and queued by the digital data queuing system for processing into billing records by the activity record processing system;
the billing records stored by the central machine data storage system and queued by the digital data queuing system for processing into a new shard by the activity record processing system;
each billing record of the new shard has at least one time-based parameter;
the time-based parameter of all the billing records of the new shard collectively fall within a fixed time interval associated with the new shard;
the new shard stored by the central machine data storage system as stored shard;
logic to merge additional of the new shard with the stored shard into merged shard on condition that the stored shard has the fixed time interval of the additional of the new shard;
logic to queue the merged shard and the stored shard for processing into invoices; and
the fixed time interval is under one hour.

2. The system of claim 1, wherein the activity records are call data records (CDRs).

3. The system of claim 2, further comprising:
a database to map mobile device identifiers in the CDRs to billed party accounts.

4. The system of claim 2, further comprising:
logic to process the CDRs to identify billable and non-billable activity.

5. The system of claim 4, further comprising:
a database of time-dependent factors; and
logic to apply the time-dependent factors to transform billable activity recorded in the CDRs into a charge amount for the invoices.

6. The system of claim 1, further comprising:
logic to apply hash-range partitioning of billed party identity to form the new shard.

7. The system of claim 1, further comprising:
each of the new shard comprises the billing records for multiple billed parties for activity by the multiple billed parties falling within the fixed time interval.

8. The system of claim 1, further comprising:
logic to perform duplicate billing record detection by analyzing the new shard for adjacent ones of the billing records having a same billing record global identity.

9. The system of claim 8, further comprising:
the billing record global identity formed by transformation of a call placement time for the billing records.

10. The system of claim 1, further comprising:
the billing records sorted within the new shard by a call placement time for the billing records.

11. A method, comprising:
queuing activity records stored in a central machine data storage system by a digital data queuing system for processing into billing records by an activity record processing system;
storing the billing records with the central machine data storage system;
queuing the billing records by the digital data queuing system for processing into a new shard by the activity record processing system;
associating with each billing record of the new shard at least one time-based parameter;
the time-based parameter of all the billing records of the new shard collectively falling within a fixed time interval associated with the new shard;
storing the new shard as stored shard;
merging additional of the new shard with the stored shard into merged shard on condition that the stored shard has the fixed time interval of the additional of the new shard;

queuing the merged shard and the stored shard for processing into invoices; and the fixed time interval is under one hour.

12. The method of claim 11, wherein the activity records are call data records (CDRs).

13. The method of claim 12, further comprising:
operating a database to map mobile device identifiers in the CDRs to billed party accounts.

14. The method of claim 12, further comprising:
transforming the CDRs into billable and non-billable activity.

15. The method of claim 14, further comprising:
transforming time-dependent factors stored in a database and billable activity recorded in the CDRs into a charge amount for the invoices.

16. The method of claim 11, further comprising:
forming the new shard from hash-range partitioning of billed party identity.

17. The method of claim 11, each of the new shard comprising the billing records for multiple billed parties for activity by the multiple billed parties falling within the fixed time interval.

18. The method of claim 11, further comprising:
filtering the new shard for adjacent ones of the billing records having a same billing record global identity.

19. The method of claim 18, further comprising:
forming the billing record global identity by transformation of a call placement time for the billing records.

20. The method of claim 11, further comprising:
sorting the billing records within the new shard by a call placement time for the billing records.

* * * * *